US012209433B2

(12) United States Patent
Chen et al.

(10) Patent No.: US 12,209,433 B2
(45) Date of Patent: Jan. 28, 2025

(54) LOCK DEVICE

(71) Applicant: KING SLIDE TECHNOLOGY CO.,LTD., Kaohsiung (TW)

(72) Inventors: Ken-Ching Chen, Kaohsiung (TW); Chun-Ta Liu, Kaohsiung (TW); Hsin-Cheng Su, Kaohsiung (TW); Shu-Chen Lin, Kaohsiung (TW)

(73) Assignee: KING SLIDE TECHNOLOGY CO., LTD., Kaohsiung (TW)

( * ) Notice: Subject to any disclaimer, the term of this patent is extended or adjusted under 35 U.S.C. 154(b) by 269 days.

(21) Appl. No.: 17/960,102

(22) Filed: Oct. 4, 2022

(65) Prior Publication Data

US 2023/0399872 A1 Dec. 14, 2023

(30) Foreign Application Priority Data

Jun. 14, 2022 (TW) ................................. 111122189

(51) Int. Cl.
*E05B 47/00* (2006.01)

(52) U.S. Cl.
CPC .. *E05B 47/0006* (2013.01); *E05B 2047/0016* (2013.01); *E05B 2047/0035* (2013.01); *E05B 2047/0067* (2013.01); *E05B 2047/0073* (2013.01); *E05B 2047/0086* (2013.01); *E05B 2047/0095* (2013.01)

(58) Field of Classification Search
CPC ......... E05B 47/0006; E05B 2047/0016; E05B 2047/0035; E05B 2047/0067; E05B 2047/0073; E05B 2047/0086; E05B 2047/0095
See application file for complete search history.

(56) References Cited

U.S. PATENT DOCUMENTS

| | | | | |
|---|---|---|---|---|
| 5,716,114 A * | 2/1998 | Holmes | E05B 47/0607 312/215 |
| 7,900,979 B2 * | 3/2011 | Bragg | A47L 15/4259 292/144 |
| 8,328,299 B2 | 12/2012 | Hashemi | |
| 11,692,374 B2 | 7/2023 | Chen | |

(Continued)

FOREIGN PATENT DOCUMENTS

| | | | |
|---|---|---|---|
| CN | 112746774 A | 5/2021 |
| DE | 20 2020 101 923 U1 | 6/2021 |

(Continued)

*Primary Examiner* — Mark A Williams
(74) *Attorney, Agent, or Firm* — Winston Hsu

(57) ABSTRACT

A lock device adapted for a first object and a second object movable relative to the first object includes a slider, a driving module, a latch and a power module. The driving module can drive the slider to move between a locking position and an unlocking position. The latch is movable relative to the slider. The power module can provide electricity to the driving module. When the second object is located at a retracted position relative to the first object, the driving module can drive the slider to move to the locking position, so that the latch blocks the second object. When the driving module is not driven by the power module, the latch is driven by the second object moving in an opening direction to move from an original state to a non-original state for driving the slider to move from the locking position to the unlocking position.

18 Claims, 13 Drawing Sheets

(56) References Cited

U.S. PATENT DOCUMENTS

| | | | | |
|---|---|---|---|---|
| 2005/0218659 | A1* | 10/2005 | Geringer | E05B 47/0669 292/164 |
| 2008/0016927 | A1* | 1/2008 | Kuo | E05B 35/12 70/278.7 |
| 2008/0303290 | A1* | 12/2008 | Yuan | E05B 47/06 292/195 |
| 2011/0066288 | A1* | 3/2011 | Sparenberg | F16P 7/00 292/144 |
| 2012/0227450 | A1* | 9/2012 | Ufkes | E05C 19/186 70/277 |
| 2013/0069514 | A1* | 3/2013 | Hashemi | A47B 88/473 292/144 |
| 2013/0298619 | A1* | 11/2013 | Ullrich | E05B 47/0012 70/283.1 |
| 2014/0054906 | A1* | 2/2014 | Wolf | E05C 19/005 292/259 R |
| 2017/0221291 | A1* | 8/2017 | Gokcebay | E05B 65/025 |
| 2019/0063113 | A1 | 2/2019 | Milligan | |
| 2020/0018098 | A1* | 1/2020 | Chen | E05B 65/462 |
| 2022/0403678 | A1 | 12/2022 | Chen | |

FOREIGN PATENT DOCUMENTS

| | | | |
|---|---|---|---|
| EP | 3 593 673 | A1 | 1/2020 |
| JP | 2011-58354 | A | 3/2011 |
| JP | 2012-525522 | A | 10/2012 |
| JP | 2020-7899 | A | 1/2020 |
| JP | 2022-191997 | A | 12/2022 |

* cited by examiner

LOCK DEVICE

BACKGROUND OF THE INVENTION

1. Field of the Invention

The present invention relates to a lock device, more specifically, to a lock device adapted for two objects movable relative to each other.

2. Description of the Prior Art

Generally, slide rail assemblies can be used in rack systems in homes, offices or electronic apparatuses. The slide rail assembly includes a first rail disposed on a first object and a second rail disposed on a second object. For example, the first object and the second object respectively can be a cabinet and a drawer. The drawer can be opened or retracted relative to the cabinet by a movement of the second rail relative to the first rail. However, sometimes, it is not desired to configure the second rail and the second object to freely move away from a predetermined position relative to the first rail and the first object, so as to meet different requirements.

For example, in U.S. Pat. No. 8,328,299 B2, it discloses a drawer slide with a locking mechanism. The locking mechanism is an electronic lock. As shown in FIG. 1 of U.S. Pat. No. 8,328,299 B2, the drawer slide includes an outer slide member and an inner slide member. The inner slide member can be located at a retracted position relative to the outer slide member. A pin is disposed on a rear end of the inner slide member. Besides, the locking mechanism includes a latch receiver, a lever arm and a motor. As shown in FIG. 1 and FIG. 2 of U.S. Pat. No. 8,328,299 B2, the latch receiver can be located at a first position, and when the latch receiver is located at the first position, the latch receiver is configured to receive the pin disposed on the inner slide member. When the inner slide member is retracted, the latch receiver is pushed by the pin to rotate from the first position to a second position for locking the inner slide member. As shown in FIG. 11 of U.S. Pat. No. 8,328,299 B2, once the motor receives an electrical control signal, the motor can drive the lever arm to rotate to an unlocking position, so that a top portion of the lever arm does not block the latch receiver. When the top portion of the lever arm does not block the latch receiver, the latch receiver is driven by a spring to rotate from the second position to the first position for allowing the pin to be released from the latch receiver. By allowing the pin to be released from the latch receiver, the inner slide member can be released relative to the outer slide member, i.e., the inner slide member can depart away from the retracted position relative to the outer slide member.

It should be noticed that, in U.S. Pat. No. 8,328,299 B2, it further discloses a manual release. The manual release is extended or exposed out of a case of the locking mechanism. When a power failure or a damage of an electronic component occurs, the manual release can be pulled to drive the lever arm to move to the unlocking position, so that the latch receiver is driven by the spring to move back to the first position for releasing the pin, so as to allow the inner slide member to depart away from the retracted position.

Besides, in U.S. Patent Publication No. 2019/0063113 A1, it discloses an electronic lock which utilizes a motor to drive a latch to move between a locking position and an unlocking position and further discloses a manual lanyard release mechanism for driving the latch to move from the locking position to the unlocking position when the manual lanyard release mechanism is pulled.

Furthermore, in China Patent No. 112746774 A and Taiwan Patent No. 1702017, each of them discloses an electronic lock which achieves a manual unlocking function by applying an acting force with an additional mechanism, such as pulling a nylon rope or operating a linkage set. The additional mechanism is disposed on an outer surface of a cabinet and covered by a decoration plate or any other component, however, which causes negative impacts on utilization convenience and aesthetic appearance.

Considering different requirements or different operational principles, sometimes, it is not desired to achieve a locking function by any of the manners disclosed in the aforementioned patent documents. Furthermore, each of the aforementioned electronic locks requires a manual unlocking mechanical device, such as the manual release, when a power failure or a damage of an electronic component occurs. Therefore, developing a different lock device becomes an important topic in the field.

SUMMARY OF THE INVENTION

The present invention relates to a lock device which can be adapted for a first object and a second object movable relative to the first object.

According to an aspect of the present invention, a lock device adapted for a first object and a second object movable relative to the first object includes a slider, a driving module, a latch and a power module. The driving module is configured to drive the slider to move between a locking position and an unlocking position. The latch is movably arranged on the slider. The power module is configured to provide electricity to the driving module. When the second object is located at a retracted position relative to the first object, the driving module is configured to drive the slider to move to the locking position, so that the latch blocks the second object. When the driving module is not driven by the power module, the latch is driven by a movement of the second object to a predetermined position in an opening direction to move from an original state to a non-original state for driving the slider to move from the locking position to the unlocking position.

Preferably, the driving module includes a magnetic component configured to retain the slider at the unlocking position when the slider is located at the unlocking position.

Preferably, the lock device further includes a resilient component. When the slider is retained at the unlocking position, a movement of the second object from the predetermined position in a retracted direction causes the latch to move from the non-original state to the original state in response to a resilient force provided by the resilient component for allowing the second object to move to an extended position in the opening direction.

Preferably, the lock device further includes a first sensor configured to sense whether the second object is located at the retracted position.

Preferably, the lock device further includes a second sensor configured to sense whether the slider is located at the locking position.

Preferably, the lock device further includes a base mounted on one of the first object and the second object, and the slider, the driving module, the first sensor and the second sensor are arranged on the base.

According to another aspect of the present invention, a lock device adapted for a first object and a second object linearly movable relative to the first object includes a slider, a driving module, a latch and a power module. The driving module is configured to drive the slider to move between a locking position and an unlocking position. The latch is movable relative to the slider. The power module is configured to provide electricity to the driving module. When the second object is located at a retracted position relative to the first object, the driving module is configured to drive the slider to the locking position. When the driving module is not driven by the power module, the latch is driven by a movement of the second object in an opening direction to rotate by a predetermined angle for driving the slider to move from the locking position to the unlocking position.

Preferably, the driving module includes a magnetic component configured to retain the slider at the unlocking position when the slider is located at the unlocking position.

Preferably, the lock device further includes a resilient component. When the slider is retained at the unlocking position, a movement of the second object in a retracted direction causes the latch to move to an original state in response to a resilient force provided by the resilient component for allowing the second object to move to an extended position in the opening direction.

Preferably, the latch is pivotally connected to the slider.

Preferably, the lock device further includes a base mounted on one of the first object and the second object, and the slider and the driving module are arranged on the base.

Preferably, the lock device further includes a first sensor configured to sense whether the second object is located at the retracted position.

Preferably, the lock device further includes a second sensor configured to sense whether the slider is located at the locking position.

According to another aspect of the present invention, a lock device adapted for a first object and a second object movable relative to the first object is communicated with a communication device and includes a slider, a driving module, a latch and a power module. The driving module is for driving the slider. The latch is movable relative to the slider. The power module is configured to provide electricity to the driving module. When the second object is located at a retracted position relative to the first object and the lock device receives a locking signal from the communication device, the driving module is configured to drive the slider to move to a locking position, so that the latch blocks the second object. When the locking device receives an unlocking signal from the communication device, the driving module is configured to drive the slider to move to an unlocking position, so that the latch does not block the second object. When the driving module is not driven by the power module, the latch is driven by a movement of the second object to a predetermined position in an opening direction to move from an original state to a non-original state for driving the slider to move from the locking position to the unlocking position.

Preferably, the driving module includes a magnetic component configured to retain the slider at the unlocking position when the slider is located at the unlocking position.

Preferably, the lock device further includes a resilient component. When the slider is retained at the unlocking position, a movement of the second object from the predetermined position in a retracted direction causes the latch to move from the non-original state to the original state in response to a resilient force provided by the resilient component for allowing the second object to move to an extended position in the opening direction.

Preferably, the lock device further includes a first sensor configured to sense whether the second object is located at the retracted position.

Preferably, the lock device further includes a second sensor configured to sense whether the slider is located at the locking position.

Preferably, the lock device further includes a base mounted on the first object, and the slider, the driving module, the first sensor and the second sensor being arranged on the base.

Preferably, the base is detachably mounted on the first object.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "left", "right", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, if not specified, the term "connect" is intended to mean either an indirect or direct mechanical connection. Thus, if a first device is connected to a second device, that connection may be through a direct mechanical connection, or through an indirect mechanical connection via other devices and connections.

Figure 1:
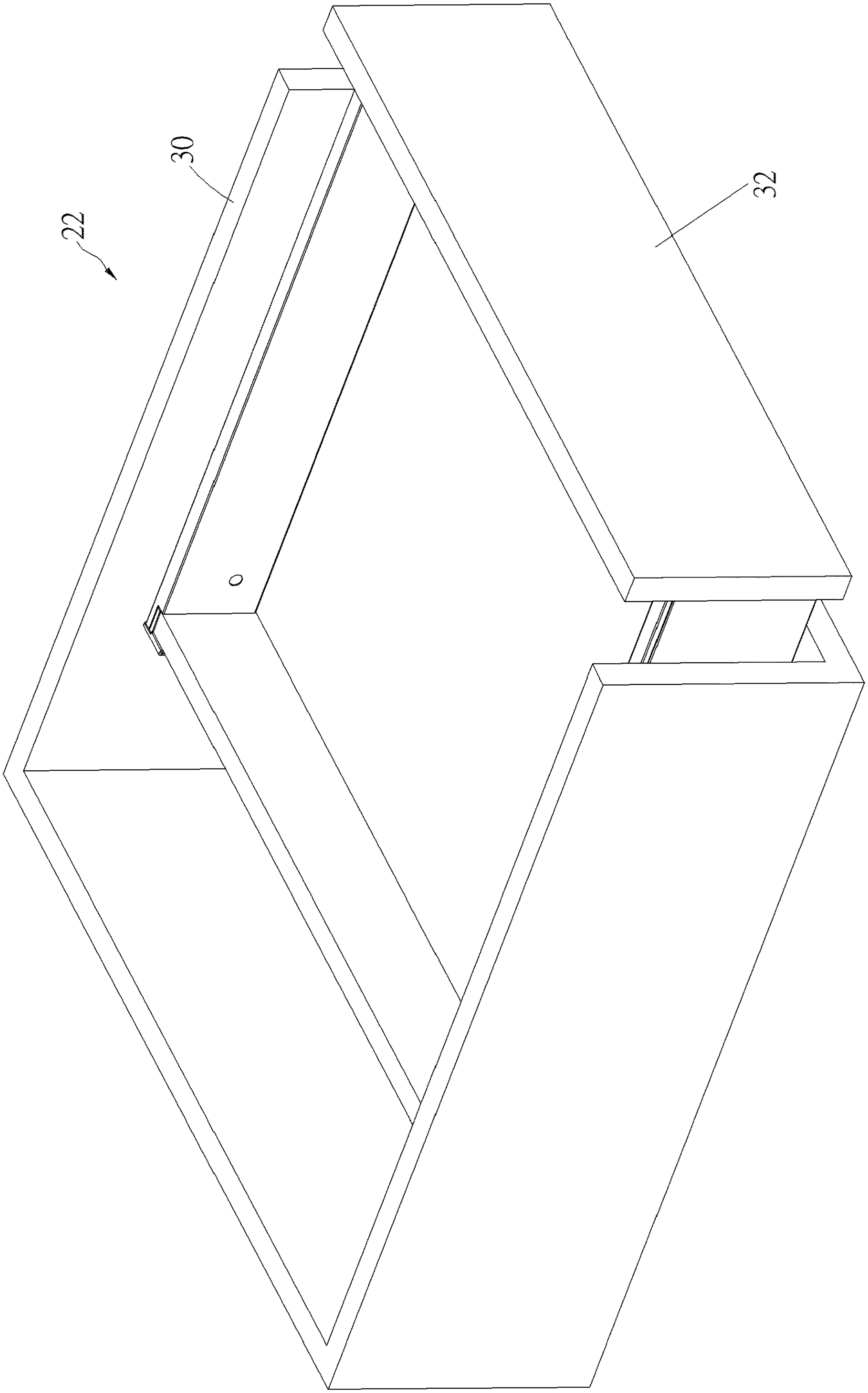
FIG. 1 is a diagram of a lock device adapted for a furniture according to an embodiment of the present invention.
Figure 2:
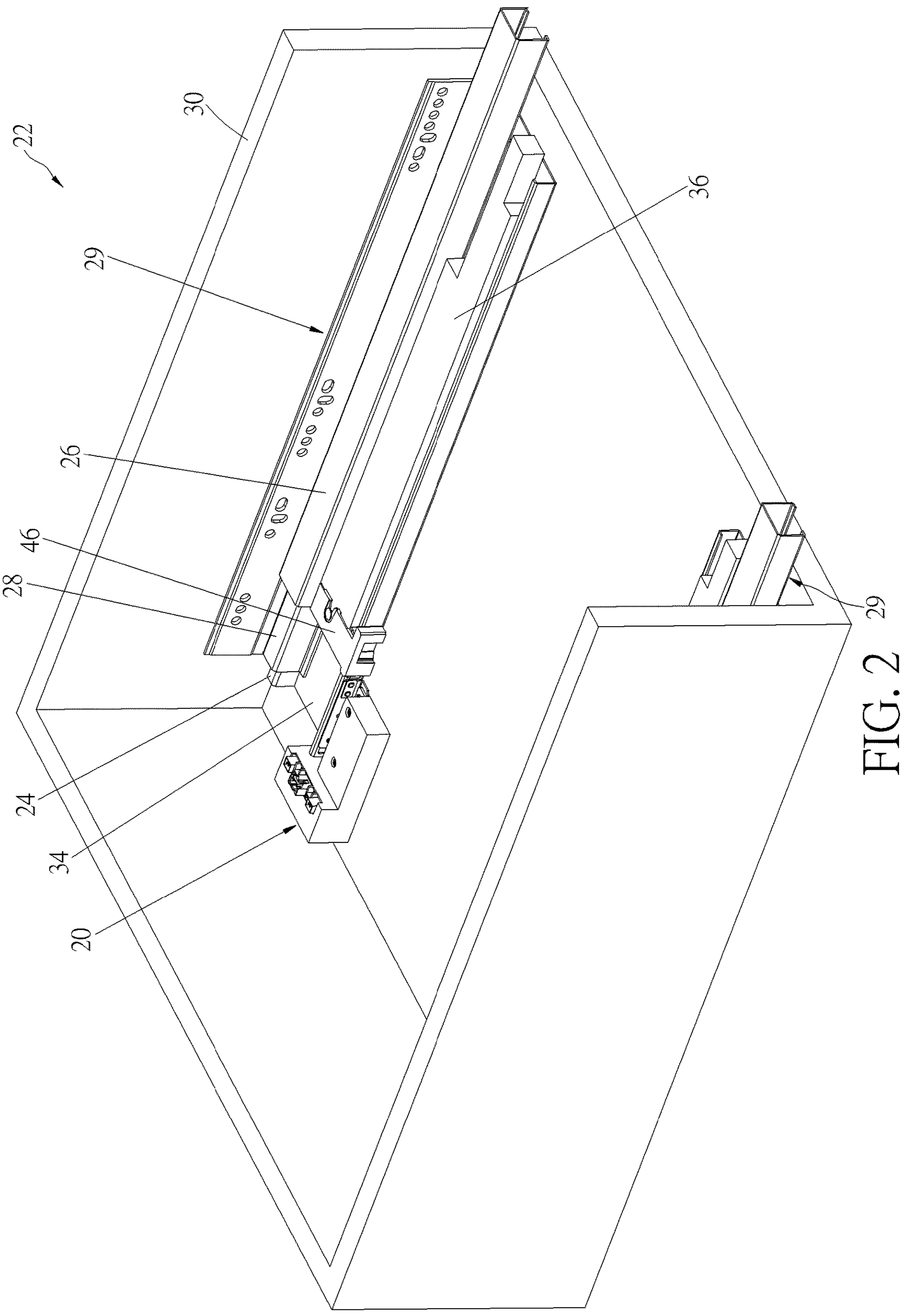
FIG. 2 is a partial diagram of the lock device adapted for the furniture according to the embodiment of the present invention.

As shown in FIG. 1 and FIG. 2, in an embodiment of the present invention, a lock device 20 is adapted for a furniture 22. For example, the lock device 20 can be a smart lock or an electronic lock. The furniture 22 includes a first object 24 and a second object 26 movable relative to the first object 24.

Preferably, the furniture 22 further includes a third object 28 movably mounted between the first object 24 and the second object 26. For example, the first object 24, the second object 26 and the third object 28 can respectively be a first rail, e.g., a fixed rail, a second rail, e.g., a movable rail, and a third rail between the first rail and the second rail, e.g., a middle rail between the fixed rail and the movable rail. However, the present invention is not limited thereto. The first object 24, the second object 26 and the third object 28 are movable relative to one another longitudinally or linearly and cooperatively form an under-mount slide rail assembly 29. Besides, in another embodiment, the furniture can only include the first rail and the second rail, and the third rail can be omitted.

Preferably, the first object 24 is arranged on, e.g., fixedly disposed on, a cabinet 30 of the furniture 22, and the second object 26 is arranged on, e.g., fixedly disposed on, a drawer 32 of the furniture 22 and configured to support the drawer 32. The drawer 32 is movable relative to the cabinet 30 by a movement of the second object 26 relative to first object 24.

Preferably, the first object 24 includes an extending portion 34. The second object 26 includes a supporting portion 36.

Figure 3:
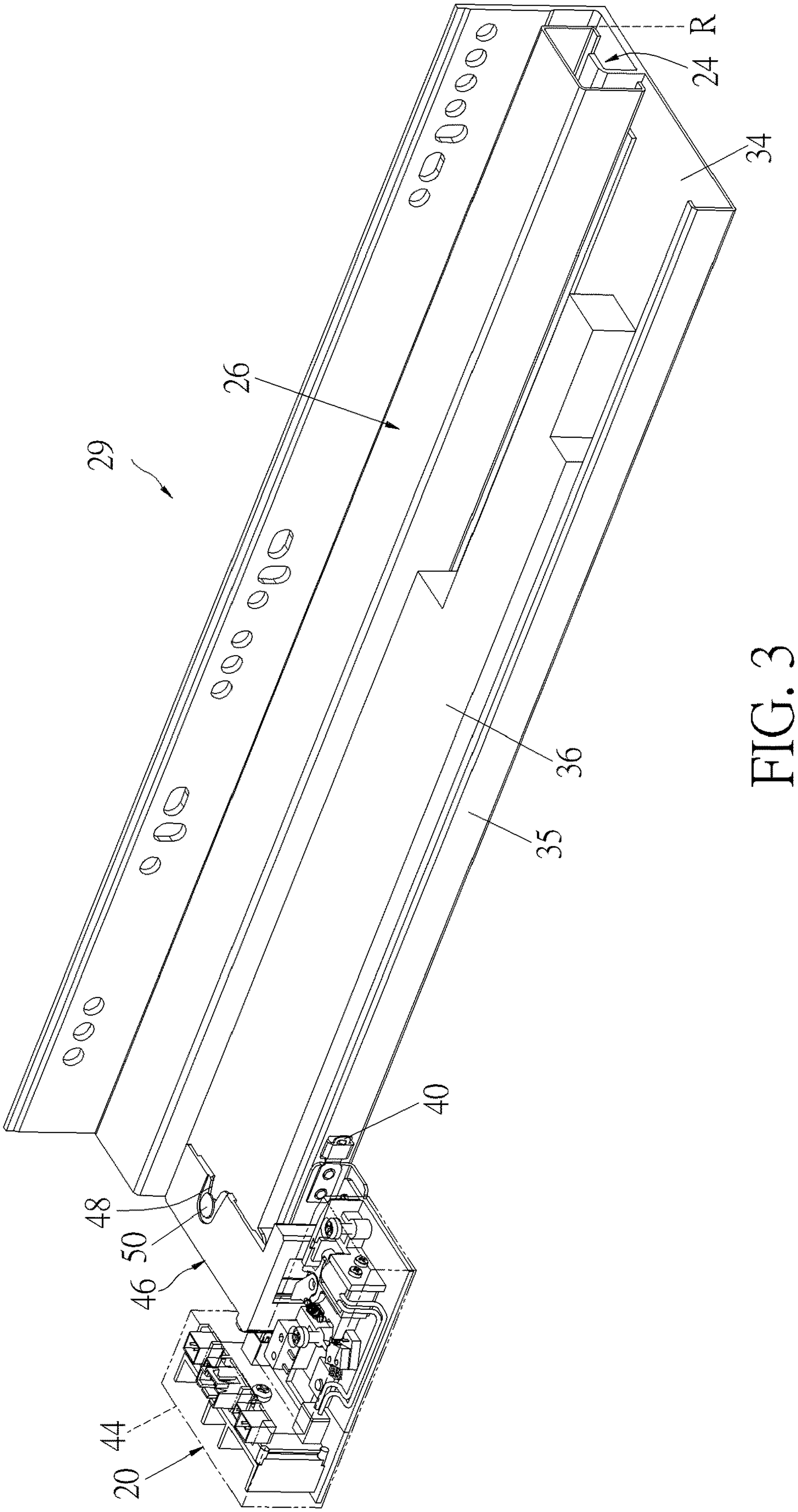
FIG. 3 is a diagram of the lock device adapted for a first object and a second object of the furniture according to the embodiment of the present invention.
Figure 4:
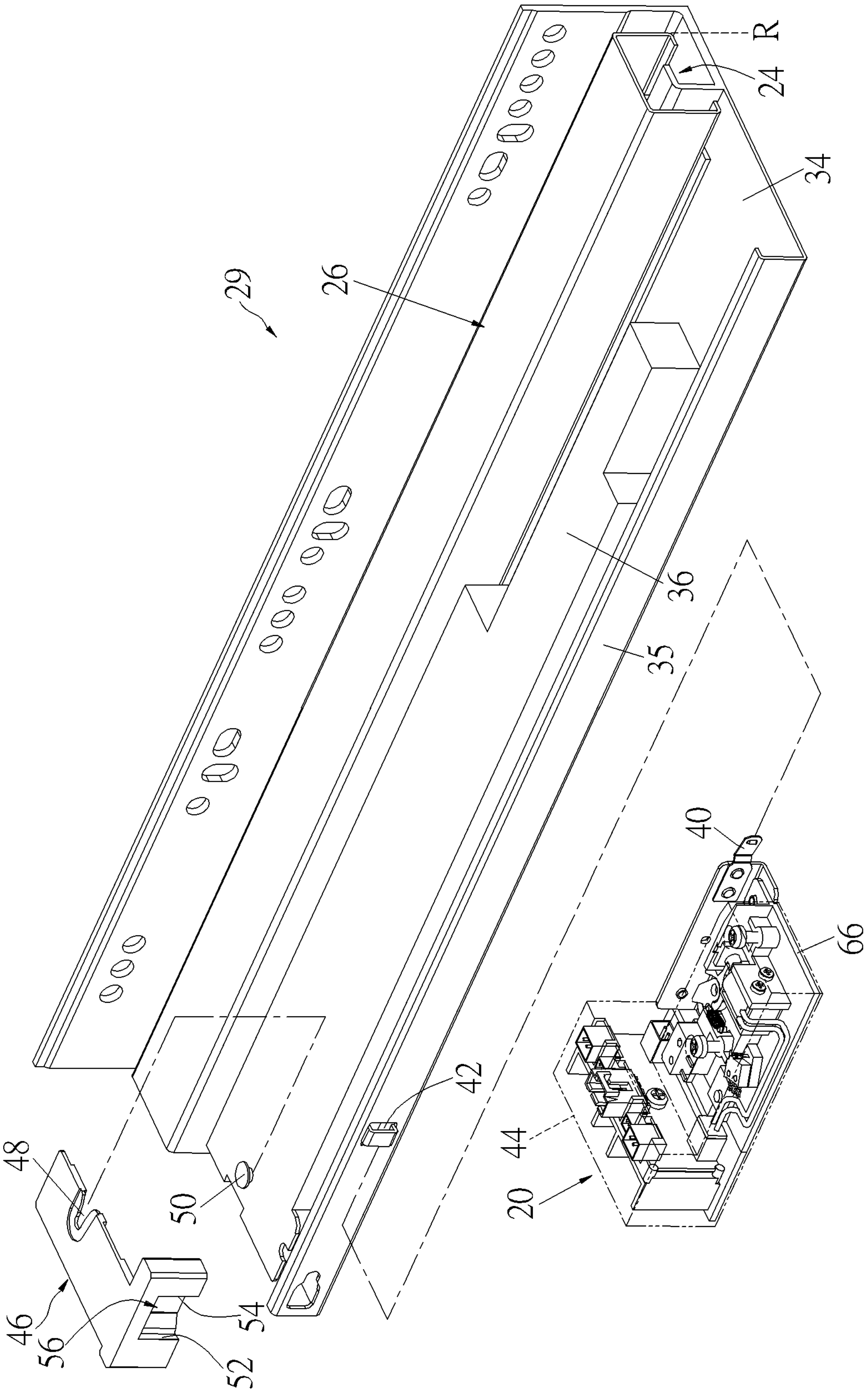
FIG. 4 is an exploded diagram of the lock device adapted for the first object and the second object of the furniture according to the embodiment of the present invention.

As shown in FIG. 3 and FIG. 4, the second object 26 can be located at a retracted position R relative to the first object 24, and when the second object 26 is located at the retracted position R, the supporting portion 36 of the second object 26 is located at a position substantially corresponding to the extending portion 34 of the first object 24.

Preferably, the lock device 20 is mounted on the first object 24. Specifically, the lock device 20 includes a mounting feature 40. A lateral wall 35 of the extending portion 34 of the first object 24 includes a mounting structure 42 for detachably engaging with the mounting feature 40. The lock device 20 is detachably mounted on the first object 24 by a cooperation of the mounting feature 40 and the mounting structure 42. For example, one of the mounting feature 40 and the mounting structure 42 can be a protruding portion, and the other of the mounting feature 40 and the mounting structure 42 can be a slot. However, the present invention is not limited thereto. In another embodiment, the lock device 20 can be mounted on the first object 24 by a screw component or through a welding process.

Preferably, the lock device 20 further includes a case 44 configured to cover and protect most of related components of the lock device 20.

Preferably, the furniture 22 further includes an accessory component 46 detachably mounted on the supporting portion 36 of the second object 26 for cooperating with the lock device 20. Specifically, the accessory component 46 includes a connecting feature 48, and the supporting portion 36 of the second object 26 includes a connecting structure 50 for detachably engaging with the connecting feature 48. The accessory component 46 is detachably mounted on the supporting portion 36 of the second object 26 by a cooperation of the connecting feature 48 and the connecting structure 50. For example, one of the connecting feature 48 and the connecting structure 50 can be an engaging slot, and the other of the connecting feature 48 and the connecting structure 50 can be an engaging protrusion. However, the present invention is not limited thereto. For example, the accessory component 46 can be configured as an extending part of the second object 26 as the accessory component 46 is mounted on the second object 26. Besides, in another embodiment, the accessory component 46 can be mounted on the second object 26 by a screw component or be integrally formed with the second object 26 through a welding process or an injection molding process.

Preferably, the accessory component 46 includes a first predetermined portion 52, a second predetermined portion 54 and a space 56 defined between the first predetermined portion 52 and the second predetermined portion 54.

Figure 6:
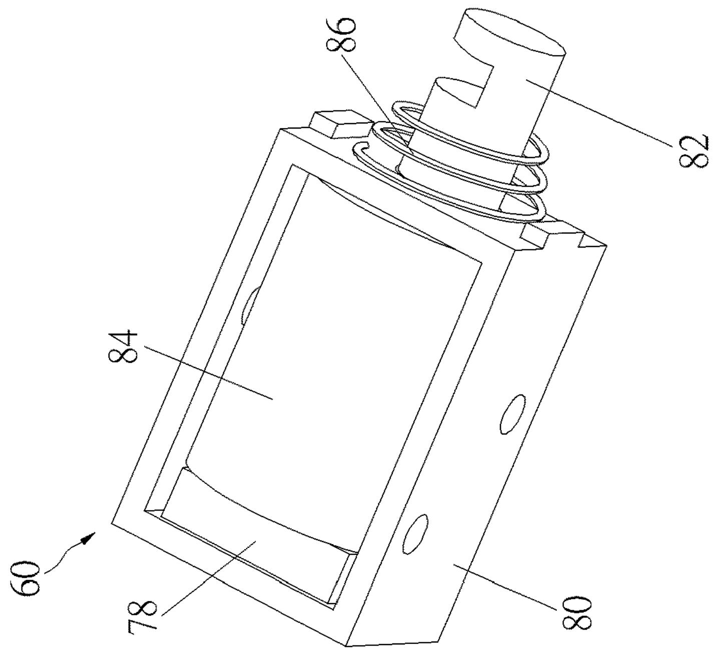
FIG. 6 is a diagram of a driving module of the lock device according to the embodiment of the present invention.
Figure 5:
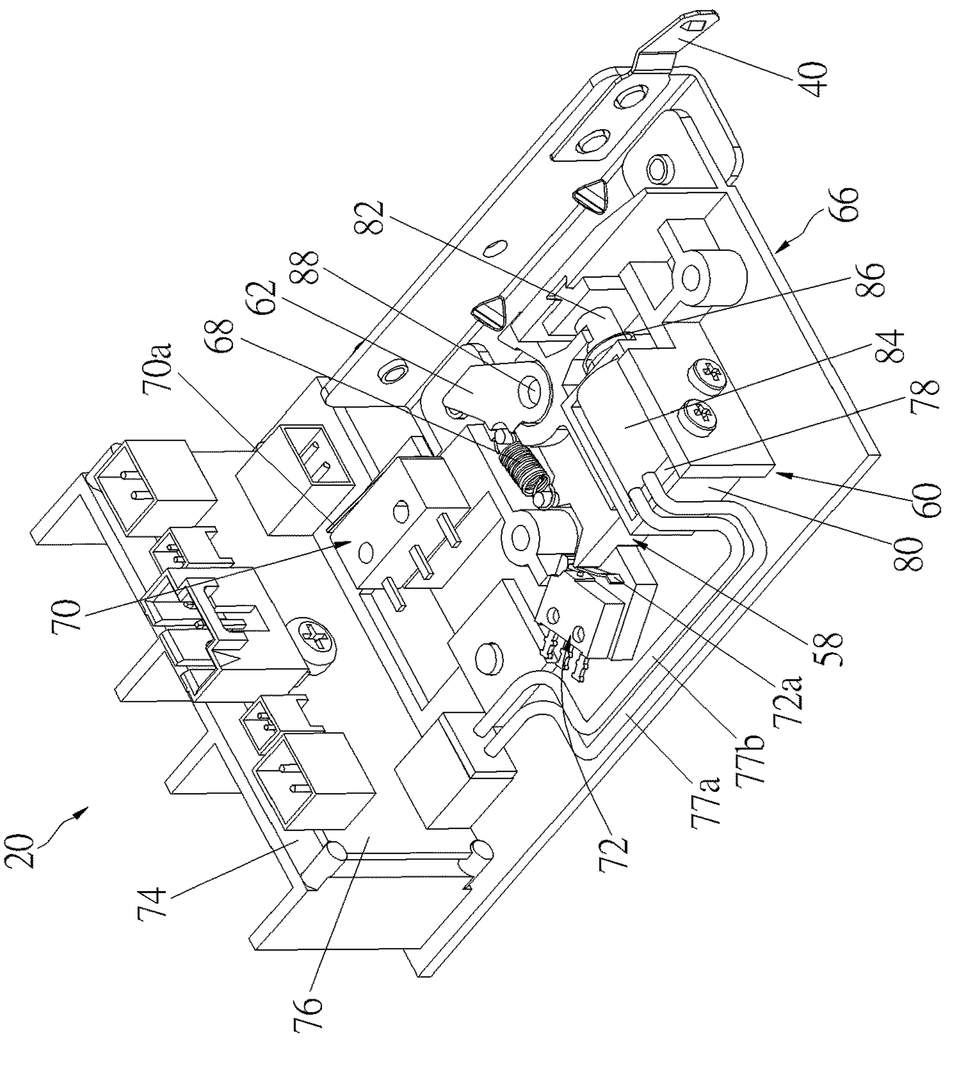
FIG. 5 is a diagram of the lock device detached from the furniture according to the embodiment of the present invention.

As shown in FIG. 5 and FIG. 6, the lock device 20 includes a slider 58, a driving module 60 and a latch 62.

Preferably, for example, the lock device 20 further includes a base 66, a resilient component 68, a first sensor 70, a second sensor 72, a fixing seat 74 and a control circuit board 76.

The mounting feature 40 is disposed on the base 66 for cooperating with the mounting structure 42 for configuring the lock device 20 to be detachably mounted on the first object 24. The slider 58, the driving module 60, the latch 62, the resilient component 68, the first sensor 70, the second sensor 72, the fixing seat 74 and the control circuit board 76 are arranged on the base 66. The fixing seat 74 is vertically or perpendicularly disposed on the base 66. At least a portion of the control circuit board 76 is arranged on the fixing seat 74.

The driving module 60 is electrically connected to the control circuit board 76. For example, the driving module 60 can be electrically connected to the control circuit board 76 by a first electrical wire **77*a* and a second electrical wire 77*b***. However, the present invention is not limited thereto.

The driving module 60 includes a magnetic component 78. For example, the magnetic component 78 can be a permanent magnetic. However, the present invention is not limited thereto. Preferably, the driving module 60 can be an electromagnetic module and further includes an accommodating shell 80, a metal rod 82, a coil 84 and an elastic component 86. For example, the metal rod 82 can be a ferrite core. However, the present invention is not limited thereto. The magnetic component 78 and the coil 84 are arranged inside the accommodating shell 80. The metal rod 82 can be extended or retracted relative to the accommodating shell 80 by the coil 84 when a current flows through the coil 84. The elastic component 86 is configured to provide an elastic force to the metal rod 82. For example, the elastic component 86 can be a spring sleeved outside the metal rod 82. However, the present invention is not limited thereto.

The slider 58 is connected to the metal rod 82. For example, the slider 58 can be fixedly connected to the metal rod 82. However, the present invention is not limited thereto. The latch 62 is movable relative to the slider 58. Specifically, the latch 62 is movably arranged on the slider 58. For example, the latch 62 can be pivotally connected to the slider 58 by a pivoting shaft 88. However, the present invention is not limited thereto.

Preferably, the resilient component 68 can provide a resilient force to the latch 62. The first sensor 70 and the second sensor 72 can be electrically connected to the control circuit board 76.

Figure 7:
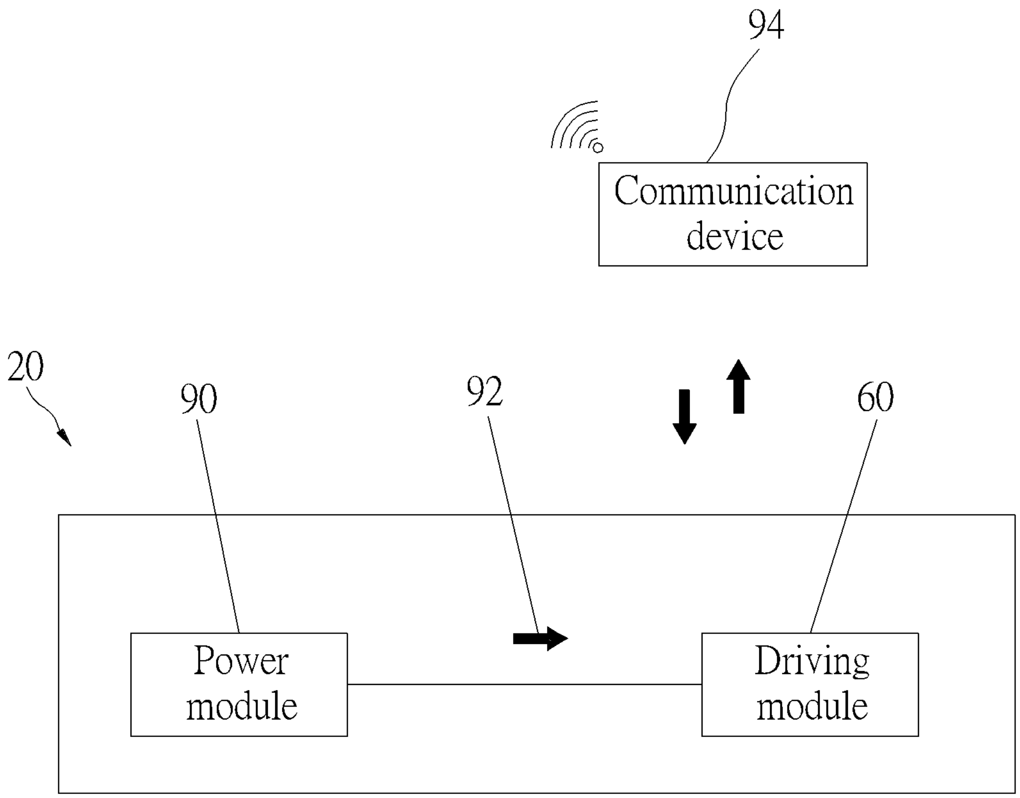
FIG. 7 is a functional block diagram of the lock device communicated with a communication device according to the embodiment of the present invention.

As shown in FIG. 7, the lock device 20 further includes a power module 90. The power module 90 is configured to provide electricity 92 to the driving module 60. Preferably, the power module 90 is electrically connected to the control circuit board 76. A communication device 94 is communicated with the lock device 20 in a wired or wireless manner for controlling the driving module 60. For example, the communication device 94 can be a mobile phone, a tablet computer or a smart watch, and the power module 90 can be a battery module. However, the present invention is not limited thereto.

Figure 8:
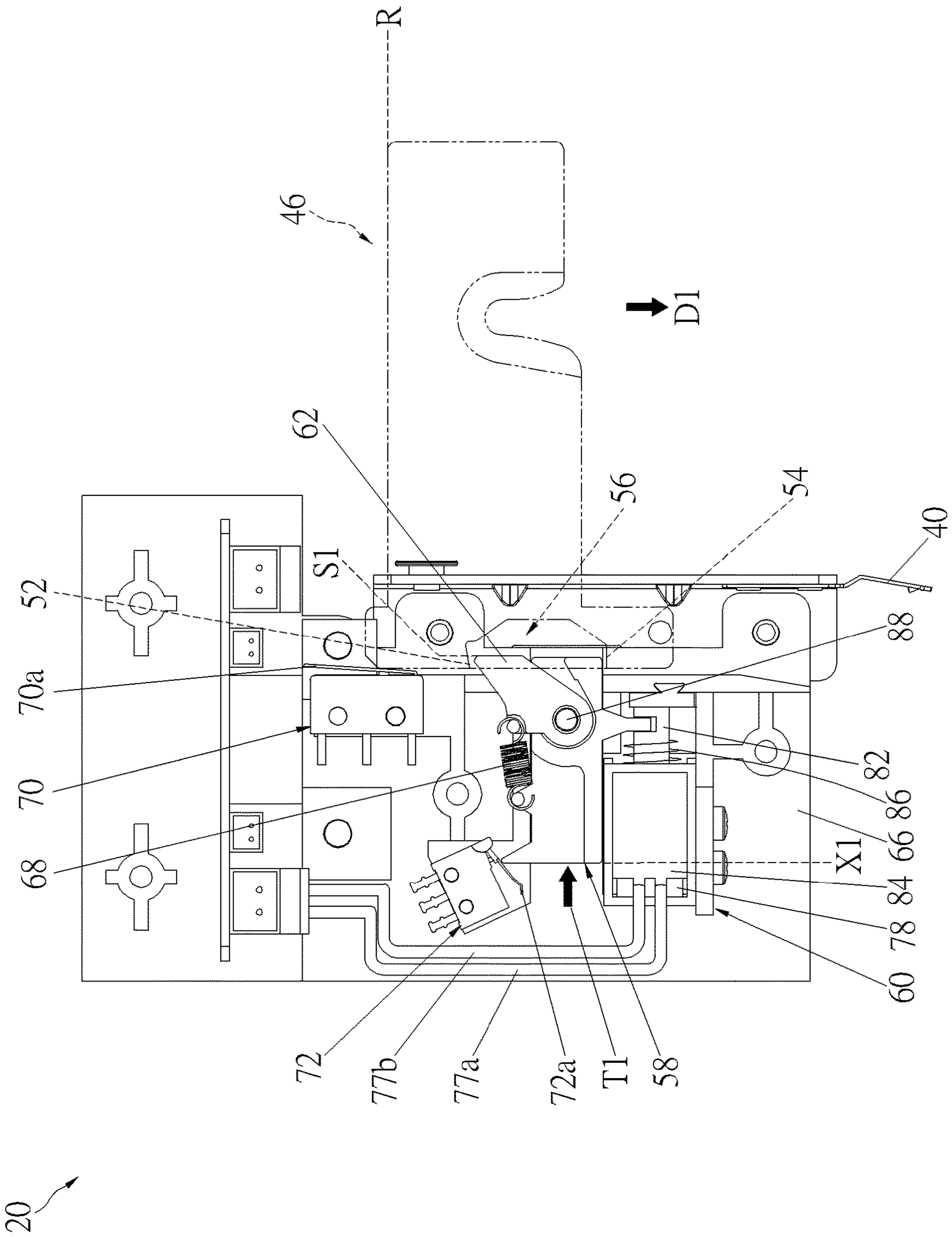
FIG. 8 is a diagram illustrating the furniture is locked by the lock device according to the embodiment of the present invention.
Figure 9:
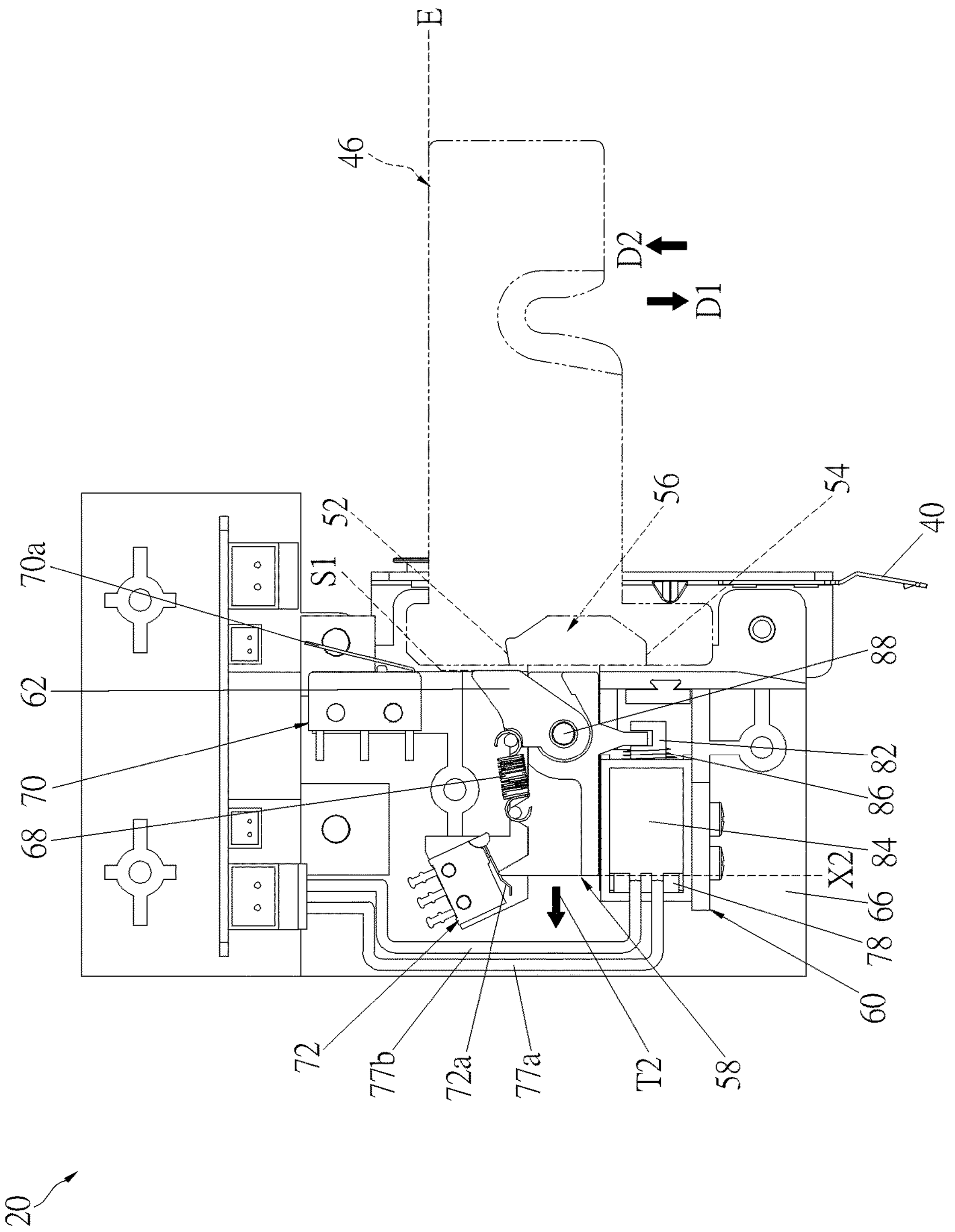
FIG. 9 is a diagram illustrating the furniture is unlocked by the lock device according to the embodiment of the present invention.

As mentioned above, the accessory component 46 and the lock device 20 can respectively be mounted on the second object 26 and the first object 24, and the accessory component 46 and the second object 26 can move together. As shown in FIG. 8 and FIG. 9, FIG. 8 only illustrates the accessory component 46 and the lock device 20 without the second object 26, the drawer 32, the first object 24 and the cabinet 30 as the second object 26 is located at the retracted position R, and FIG. 9 only illustrates the accessory component 46 and the lock device 20 without the second object 26, the drawer 32, the first object 24 and the cabinet 30 as the second object 26 is located at an extended position E.

The driving module 60 is configured to drive the slider 58. Specifically, the driving module 60 is configured to drive the slider 58 to move between a locking position X1 as shown in FIG. 8 and an unlocking position X2 as shown in FIG. 9. Since the slider 58 is connected to the metal rod 82, when the power module 90 provides the electricity 92 to the driving module 60 to generate a current, such as a forward current or a reverse current, flowing through the coil 84 for driving the metal rod 82 to move, the slider 58 can be driven by a movement of the metal rod 82 to move to the locking position X1 as shown in FIG. 8 or the unlocking position X2 as shown in FIG. 9.

Preferably, as shown in FIG. 8, when the metal rod 82 drives the slider 58 to move to the locking position X1, the elastic component 86 provides the elastic force to the metal rod 82, so that the slider 58 is retained at the locking position X1. As shown in FIG. 9, when the metal rod 82 drives the slider 58 to move to the unlocking position X2, the magnetic component 78 magnetically attracts with the metal rod 82, so that the slider 58 is retained at the unlocking position X2.

Preferably, a moving direction of the metal rod 82 and a moving direction of the slider 58 are perpendicular to a moving direction of the second object 26. For example, the moving direction of the metal rod 82 and the moving direction of the slider 58 can be parallel to a traverse direction, and the moving direction of the second object 26 can be parallel to a longitudinal direction, e.g., an opening direction D1 or a retracted direction D2.

As shown in FIG. 8, when the second object 26 is located at the retracted position R relative to the first object 24, the driving module 60 can drive the slider 58 to move to the locking position X1 in a first traverse direction T1, so that the latch 62 can block the second object 26. For example, when the slider 58 is located at the locking position X1, the latch 62 is partially inserted into the space 56 of the accessory component 46, so that the latch 62 can block the first predetermined portion 52 of the accessory component 46 for preventing the second object 26 from moving relative to the first object 24 away from the retracted position R as shown in FIG. 8 to the extended position E in the opening direction D1.

As shown in FIG. 9, the driving module 60 can further drive the slider 58 to move to the unlocking position X2 in a second traverse direction T2 opposite to the first traverse direction T1, so that the latch 62 cannot block the second object 26. For example, when the slider 58 is located at the unlocking position X2, the latch 62 is not inserted into the space 56 of the accessory component 46, so that the latch 62 cannot block the first predetermined portion 52 of the accessory component 46 for allowing the second object 26 to move relative to the first object 24 away from the retracted position R in the opening direction D1, e.g., move from the retracted position R as shown in FIG. 8 to the extended position E as shown in FIG. 9. It should be noticed that the second object 26 also can retract relative to the first object 24 from the extended position E to the retracted position R in the retracted direction D2.

Besides, the first sensor 70 is configured to sense whether the second object 26 is located at the retracted position R. Specifically, the first sensor 70 can generate a first signal or a second signal. For example, when the second object 26 is located at the retracted position R as shown in FIG. 8, a first resilient sensing portion 70*a* of the first sensor 70 can be pressed by the second object 26 or by the accessory component 46, so that the first sensor 70 generates the second signal for indicating the second object 26 is located at the retracted position R. When the first resilient sensing portion 70*a* of the first sensor 70 is not pressed by the second object 26 or by the accessory component 46, the first sensor 70 generates the first signal for indicating the second object 26 is not located at the retracted position R and is located at another position, such as an full open position or the extended position E as shown in FIG. 9.

The second sensor 72 is configured to sense whether the slider 58 is located at the locking position X1. Specifically, the second sensor 72 can generate a third signal or a fourth signal. For example, when the slider 58 is located at the locking position X1 as shown in FIG. 8, a second resilient sensing portion 72*a* of the second sensor 72 is not pressed by the slider 58, so that the second sensor 72 generates the fourth signal for indicating the slider 58 is located at the locking position X1. When the second resilient sensing portion 72*a* of the second sensor 72 is pressed by the slider 58, the second sensor 72 generates the third signal for indicating the slider 58 is located at the unlocking position X2 as shown in FIG. 9.

Figure 10:
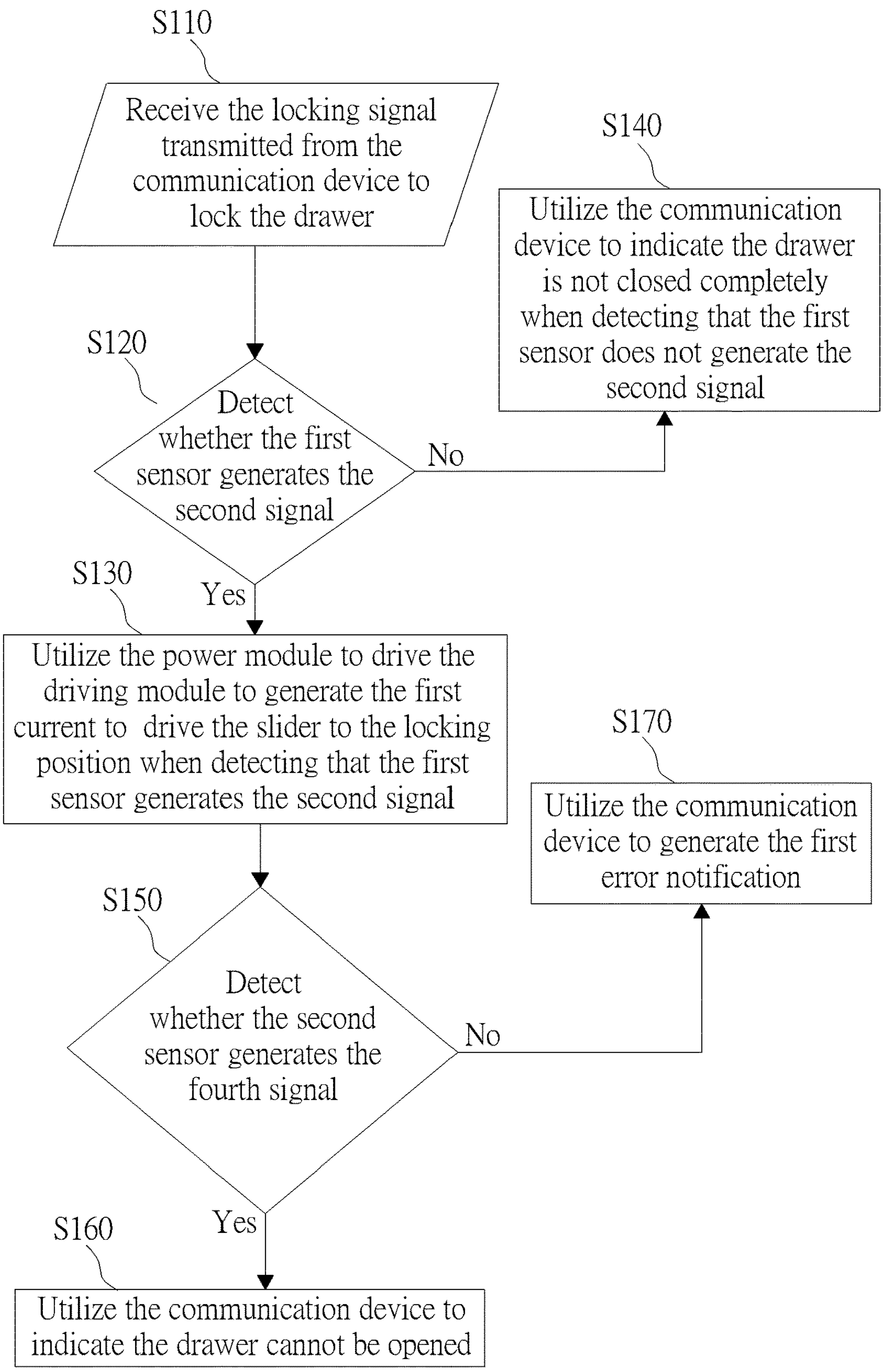
FIG. 10 is a flow chart of a locking process of the lock device according to the embodiment of the present invention.

As shown in FIG. 10, the lock device 20 executes a locking process which includes the following steps:

Step 110: Receive a locking signal transmitted from the communication device 94 to lock the drawer 32;

Step 120: Detect whether the first sensor 70 generates the second signal;

Step 130: Utilize the power module 90 to drive the driving module 60 to generate a first current to drive the slider 58 to the locking position X1 when detecting that the first sensor 70 generates the second signal;

Step 140: Utilize the communication device 94 to indicate the drawer 32 is not closed completely when detecting that the first sensor 70 does not generate the second signal;

Step 150: Detect whether the second sensor 72 generates the fourth signal;

Step 160: Utilize the communication device 94 to indicate the drawer 32 cannot be opened; and Step 170: Utilize the communication device 94 to generate a first error notification.

In step 110, for example, an application (APP) can be installed on the communication device 94. The locking signal can be transmitted to the lock device 20 via the application installed on the communication device 94 operated by a user.

In step 120, as shown in FIG. 8, the lock device 20 can detect whether the first sensor 70 generates the second signal. For example, the lock device 20 can detect the first sensor 70 generates the second signal for indicating the second object 26 is located at the retracted position R relative to the first object 24 when the first resilient sensing portion 70*a* is pressed by the second object 26 or the accessory component 46.

In step 130, when the second object 26 is located at the retracted position R relative to the first object 24, i.e., the lock device 20 detects the first sensor 70 generates the second signal, and when the lock device 20 receives the locking signal transmitted from the communication device 94, the lock device 20 utilizes the power module 90 to drive the driving module 60 to generate the first current for driving the slider 58 to move to the locking position X1, so that the latch 62 can block the second object 26. Specifically, the metal rod 82 can be driven to move in accordance with the first current passing through the coil 84, so that the slider 58 can be driven to move to the locking position X1 in response to a movement of the metal rod 82 in the first traverse direction T1 for allowing the latch 62, which is at an original state S1 as shown in FIG. 8 relative to the slider 58, to block the second object 26. The first current can be a reverse current. However, the present invention is not limited thereto.

In step 140, when the second object 26 is not located at the retracted position R relative to the first object 24, i.e., the lock device 20 detects the first sensor 70 does not generate the second signal, the communication device 94 can generate a notification sound or message for notifying the user that the second object 26 is not located at the retracted position R, i.e., the drawer 32 is not closed completely.

Furthermore, step 150 can be executed after step 130. In step 150, when the driving module 60 generates the first current for driving the slider 58 to move to the locking position X1, the lock device 20 can detect whether the second sensor 72 generates the fourth signal. For example, the lock device 20 can detect the second sensor 72 generates the fourth signal for indicating the slider 58 is located at the locking position X1 when the second resilient sensing portion 72*a* of the second sensor 72 is not pressed by the slider 58.

In step 160, when the lock device 20 detects the second sensor 72 generates the fourth signal, which means the slider 58 is located at the locking position X1 and the latch 62 blocks the second object 26 for preventing the second object 26 from moving away from the retracted position R as shown in FIG. 8 in the opening direction D1 relative to the first object 24, the lock device 20 utilizes the communication device 94 to indicate the drawer 32 cannot be opened.

In step 170, when the lock device 20 detects the second sensor 72 does not generate the fourth signal, which means the slider 58 is not located at the locking position X1, the lock device 20 utilizes the communication device 94 to generate a first error notification, such as an error notification sound or message, for notifying the user that the slider 58 is not located at the locking position X1 properly.

Figure 11:
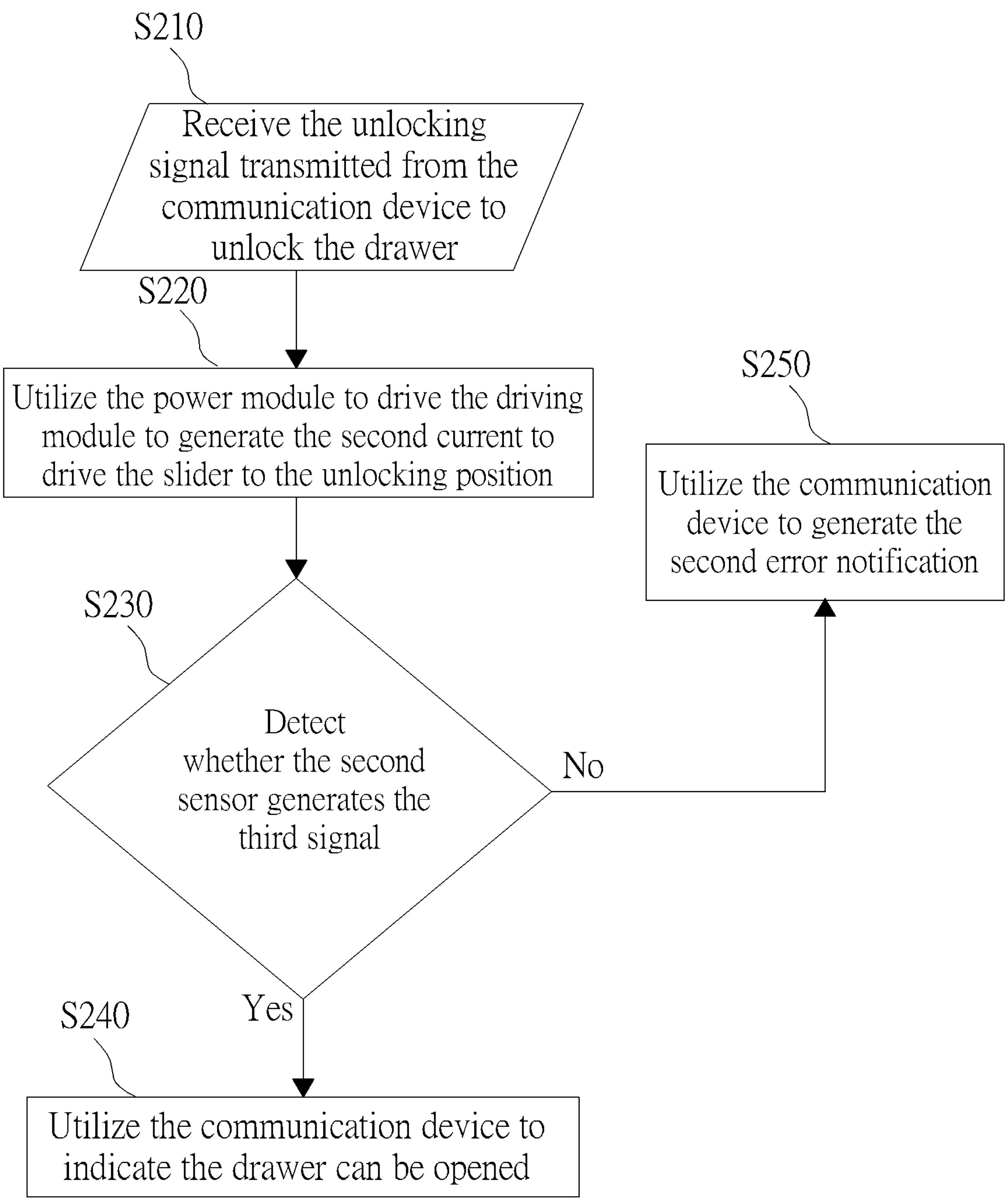
FIG. 11 is another flow chart of an unlocking process of the lock device according to the embodiment of the present invention.

As shown in FIG. 11, the lock device 20 executes an unlocking process which includes the following steps:

Step 210: Receive an unlocking signal transmitted from the communication device 94 to unlock the drawer 32;

Step 220: Utilize the power module 90 to drive the driving module 60 to generate a second current to drive the slider 58 to the unlocking position X2;

Step 230: Detect whether the second sensor 72 generates the third signal;

Step 240: Utilize the communication device 94 to indicate the drawer 32 can be opened; and Step 250: Utilize the communication device 94 to generate a second error notification.

In step 210, the unlocking signal can be transmitted to the lock device 20 via the application installed on the communication device 94 operated by the user.

In step 220, when the lock device 20 receives the unlocking signal transmitted from the communication device 94 to unlock the drawer 32, the lock device 20 utilizes the power module 90 to drive the driving module 60 to generate the second current for driving the slider 58 to move to the unlocking position X2, so that the latch 62 cannot block the second object 26. Specifically, the metal rod 82 can be driven to move in accordance with the second current passing through the coil 84, so that the slider 58 can be driven to move to the unlocking position X2 in response to a movement of the metal rod 82 in the second traverse direction T2 for allowing the latch 62, which is located at the original state S1 as shown in FIG. 9 relative to the slider 58, not to block the second object 26. It should be noticed that when lock device 20 is switched from a state as shown in FIG. 8 to a state as shown in FIG. 9, the latch 62 is retained at the original state S1 relative to the slider 58, i.e., a position of the latch 62 relative to the slider 58 is unchanged but is moved relative to the second object 26 from an engaging position to a disengaging position. The second current can be a forward current. However, the present invention is not limited thereto.

In step 230, as shown in FIG. 9, the lock device 20 can detect whether the second sensor 72 generates the third signal. For example, the lock device 20 can detect the second sensor 72 generates the third signal for indicating the slider 58 is located at the unlocking position X2 when the second resilient sensing portion 72*a* of the second sensor 72 is pressed by the slider 58.

In step 240, when the lock device 20 detects the second sensor 72 generates the third signal, which means the slider 58 is located at the unlocking position X2 and the latch 62 does not block the second object 26, the lock device 20 utilizes the communication device 94 to indicate the drawer 32 can be opened.

In step 250, when the lock device 20 detects the second sensor 72 does not generate the third signal, which means the slider 58 is not located at the unlocking position X2, the lock device 20 utilizes the communication device 94 to generate the second error notification, such as another error notification sound or message, for notifying the user that the slider 58 is not located at the unlocking position X2 properly.

Figure 12:
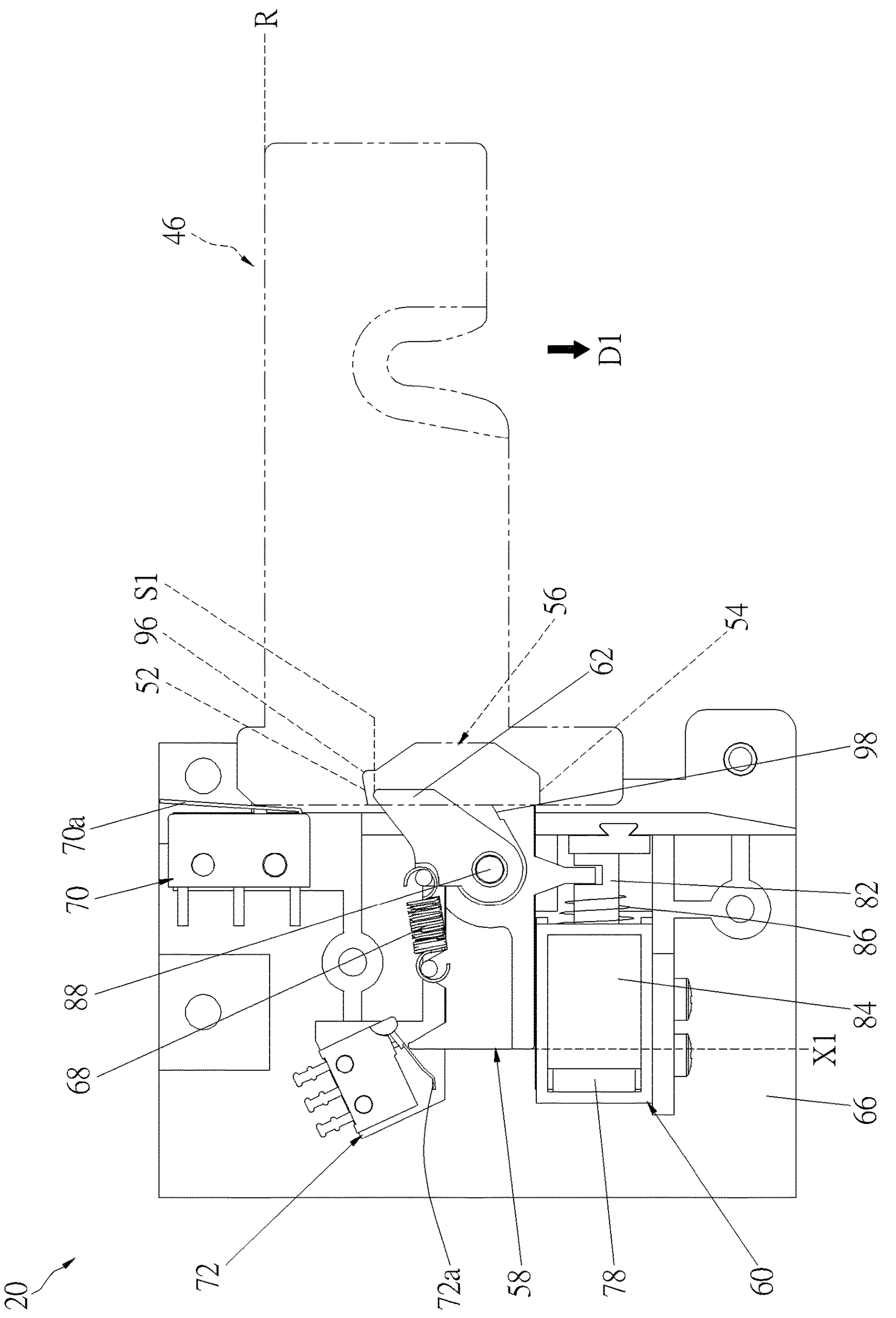
FIG. 12 is a diagram of the lock device in a first manual operating state according to the embodiment of the present invention.
Figure 13:
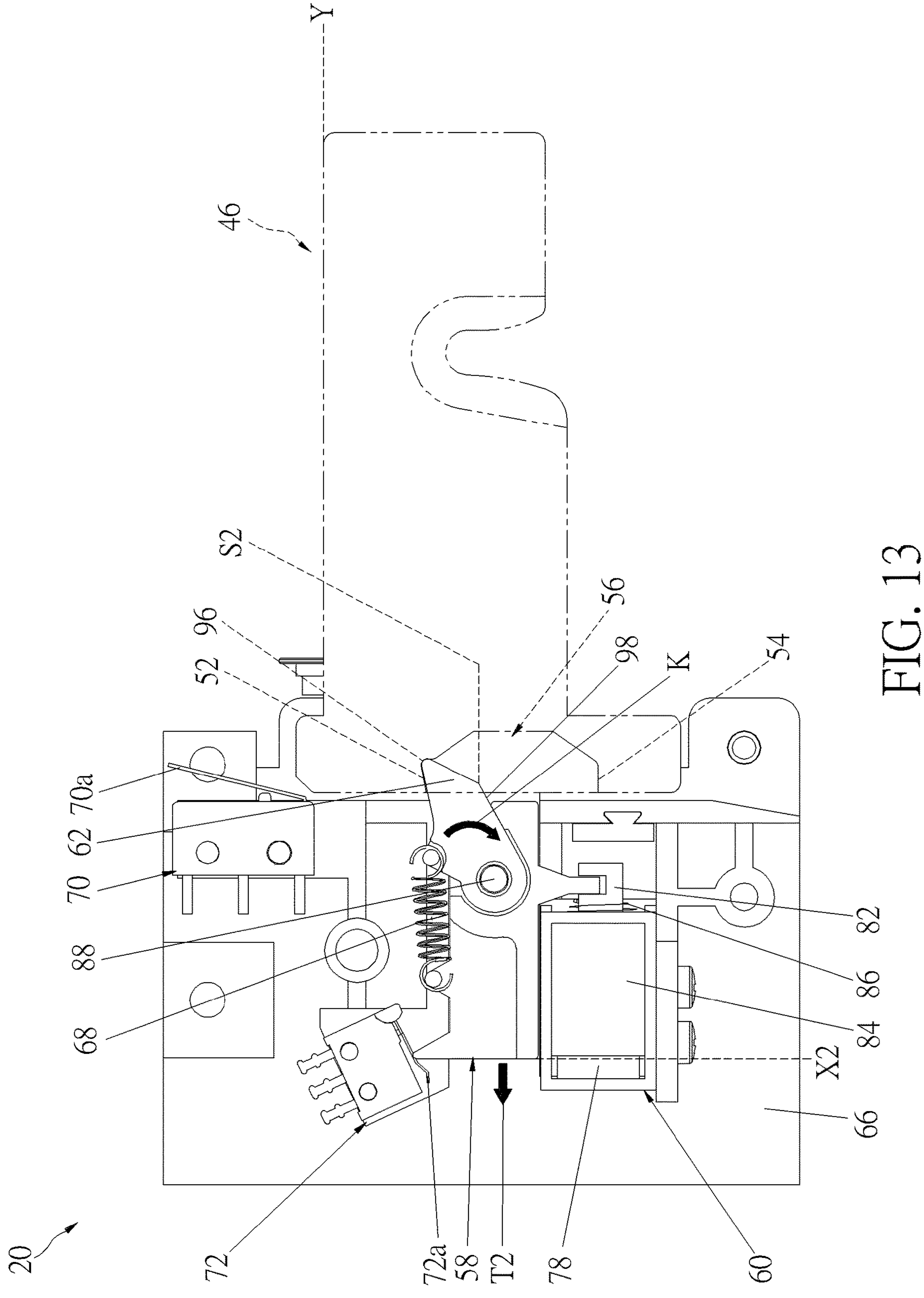
FIG. 13 is a diagram of the lock device in a second manual operating state according to the embodiment of the present invention.

When the driving module 60 is not driven by the power module e.g., when the power module 90 fails to drive the driving module due to a damage of the power module 90, or empty or lack of electricity of the power source 90, and when the slider 58 is located at the locking position X1, the latch 62 can be driven by a movement of the second object 26 from the retracted position R as shown in FIG. 12 to a predetermined position Y as shown in FIG. 13 in the opening direction D1 to move relative to the slider 58 from the original state S1 as shown in FIG. 12 to a non-original state S2 as shown in FIG. 13 for driving the slider 58 to move from the locking position X1 as shown in FIG. 12 to the unlocking position X2 as shown in FIG. 13. For example, the latch 62 can be abutted by the first predetermined portion 52 of the accessory component 46 to rotate in a predetermined direction K by a predetermined angle for driving or pushing the slider 58 to move from the locking position X1 as shown in FIG. 12 to the unlocking position X2 as shown in FIG. 13 in the second traverse direction T2. Furthermore, when the latch 62 is located at the non-original state S2 relative to the slider 58, the resilient component 68 is resiliently deformed to generate the resilient force.

Preferably, the accessory component 46 further includes an abutting portion 96 located in the space 56 and adjacent to the first predetermined portion 52. The abutting portion 96 can be a concave groove structure. However, the present invention is not limited thereto. The abutting portion 96 can engage with the latch 62 for facilitating the latch 62 to drive the slider 58 to move from the locking position X1 to the unlocking position X2 by overcoming the elastic force provided by the elastic component 86 when the latch 62 rotates relative to the slider 58 from the original state S1 to the non-original state S2.

Preferably, as shown in FIG. 13, when the slider 58 is located at the unlocking position X2, the slider 58 can be retained at the unlocking position X2 by the magnetic component 78 of the driving module 60. For example, the magnetic component 78 can magnetically attract with the metal rod 82 to retain the slider 58 at the unlocking position X2. The slider 58 includes a guiding portion 98. The guiding portion 98 can include an inclined surface. However, the present invention is not limited thereto. The latch 62 can rotate to abut against the guiding portion 98 of the slider 58. Therefore, an acting force acting on the drawer 32 for opening the drawer 32 can be transmitted to the slider 58 by the guiding portion 98, so as to restrain the second object 26 from moving away from the predetermined position Y as shown in FIG. 13 in the opening direction D1.

Figure 14:
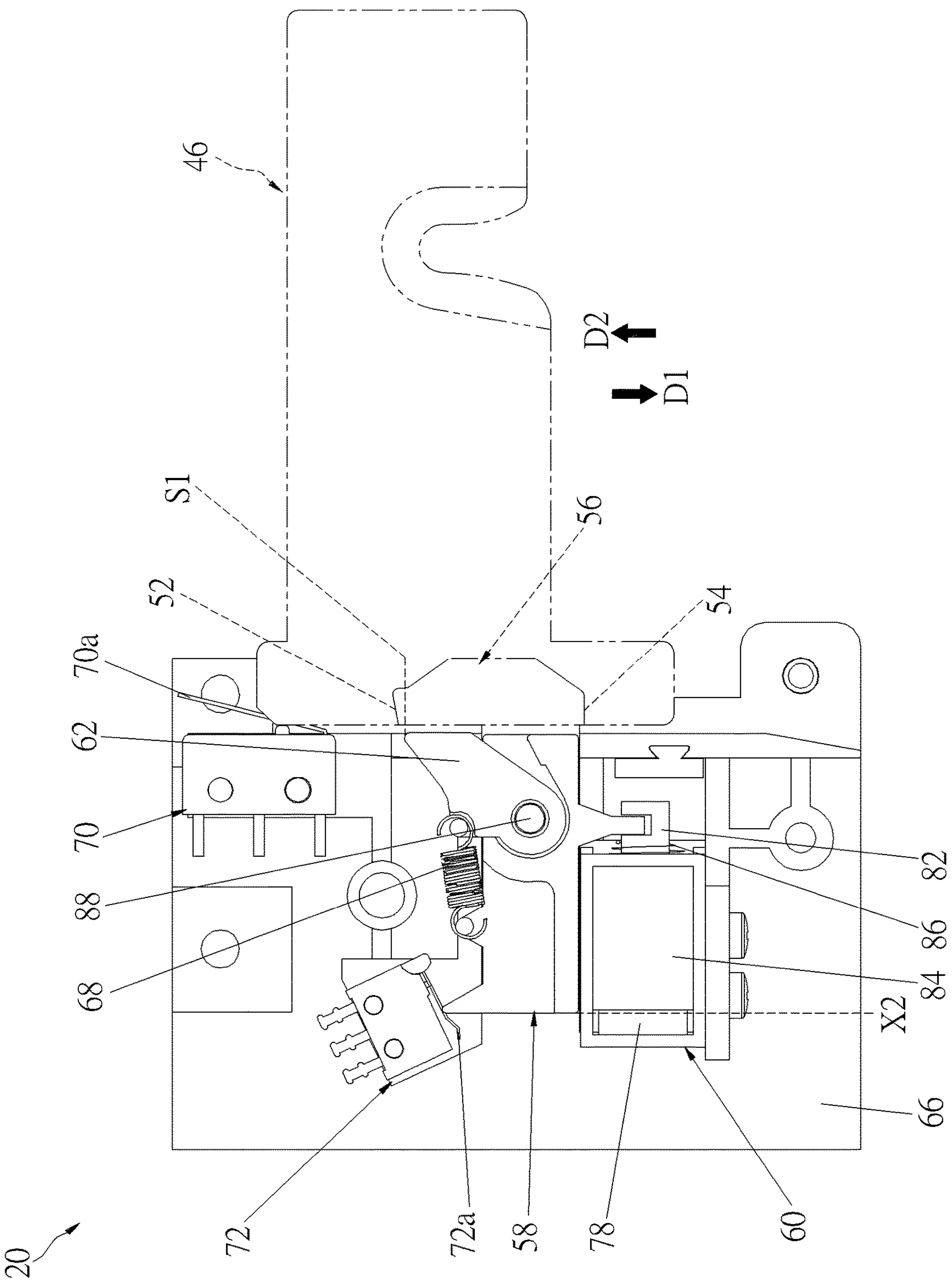
FIG. 14 is a diagram of the lock device in a third manual operating state according to the embodiment of the present invention.

As shown in FIG. 13 and FIG. 14, the second object 26 cannot move away from the predetermined position Y in the opening direction D1 but can move in the retraced direction D2. Specifically, when the slider 58 is retained at the unlocking position X2 and the second object 26 moves from the predetermined position Y as shown in FIG. 13 to a position as shown in FIG. 14 in the retracted direction D2, the latch 62 is driven to move relative to the slider 58 from the non-original state S2 to the original state S1 as shown in FIG. 14, i.e., the latch 62 is moved relative to the second object 26 back to the disengaging position, in response to the resilient force provided by the resilient component 68, so that the latch 62 does not block the first predetermined portion 52 of the accessory component 46 for allowing the second object 26 to move to the extended position E as shown in FIG. 9 or the full open direction in the opening direction D1.

However, the present invention is not limited to the aforementioned embodiment. For example, in another embodiment, the first object and the second object can be the cabinet and the drawer respectively, and the lock device can be mounted on the cabinet and utilizes the latch to detachably engage with the accessory component, which can be integrally formed with or detachably mounted on the drawer, for locking the drawer. In another embodiment, it is not required to receive the locking signal transmitted from the communication device for locking the drawer, e.g., the lock device can utilizes the power module to drive the driving module to generate the first current for driving the slider to move to the locking position when the lock device detects the first sensor generates the second signal for indicating the second object is located at the retracted position relative to the first object. In another embodiment, the first sensor and the second sensor can be a first non-contact sensor and a second non-contact sensor. The first non-contact sensor can be a first light sensor including a first light emitting component disposed on the first object, a first light receiving component disposed on the first object and a first light reflecting component disposed on the second object for reflecting light emitted from the first light emitting component to the first light receiving component when the second object is located at the retracted position, and the second non-contact sensor can be a second light sensor including a second light emitting component disposed on the first object, a second light receiving component disposed on the first object and a second light reflecting component disposed on the slider for reflecting light emitted from the second light emitting component to the second light receiving component when the slider is located at the locking position.

From the above, the lock device 20 includes the following feature: when a power failure or a damage of an electronic component of the lock device 20 occurs, a user only has to pull the second object 26 to move by a distance in the opening direction D1 to move the slider 58 to move from the locking position X1 to the unlocking position X2, so that a manual unlocking function can be performed. The present invention does not require any additional manual mechanism. Therefore, the present invention has better utilization convenience and improved aesthetic appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lock device adapted for a first object and a second object, the second object being linearly movable relative to the first object from a retracted position to an extended position in an opening direction or from the extended position to the retracted position in a retracted direction, the lock device comprising:

a slider configured to be mounted on the first object;

a driving module configured to drive the slider to move from a locking position to an unlocking position or to drive the slider to move from the unlocking position to the locking position;

a latch pivotally connected to the slider and rotatable from an original state to a non-original state or from the non-original state to the original state; and a power module configured to provide electricity to the driving module;

wherein when the second object is located at the retracted position relative to the first object, the driving module is configured to drive the slider to move to the locking position, so that the latch is partially inserted into a space of the second object to block the second object for locking the second object from moving from the retracted position;

wherein when the driving module is not driven by the power module, a movement of the second object from the retracted position to a predetermined position between the retracted position and the extended position in the opening direction drives the latch to rotate from the original state to the non-original state by a predetermined angle for driving the slider to move from the locking position to the unlocking position.

2. The lock device of claim 1, wherein the driving module comprises a magnetic component configured to retain the slider at the unlocking position when the slider is located at the unlocking position.

3. The lock device of claim 2, further comprising a resilient component, when the slider is retained at the unlocking position, a movement of the second object from the predetermined position in a retracted direction causing the latch to move from the non-original state to the original state in response to a resilient force provided by the resilient component for allowing the second object to move to an extended position in the opening direction.

4. The lock device of claim 1, further comprising a first sensor configured to sense whether the second object is located at the retracted position.

5. The lock device of claim 4, further comprising a second sensor configured to sense whether the slider is located at the locking position.

6. The lock device of claim 5, further comprising a base mounted on the first object, and the slider, the driving module, the first sensor and the second sensor being arranged on the base.

7. The lock device of claim 6, wherein the driving module comprises a magnetic component configured to retain the slider at the unlocking position when the slider is located at the unlocking position.

8. The lock device of claim 7, further comprising a resilient component, when the slider is retained at the unlocking position, a movement of the second object in a retracted direction causing the latch to move to an original state in response to a resilient force provided by the resilient component for allowing the second object to move to an extended position in the opening direction.

9. The lock device of claim 3, further comprising a base mounted on the first object, and the slider and the driving module being arranged on the base.

10. The lock device of claim 3, further comprising a first sensor configured to sense whether the second object is located at the retracted position.

11. The lock device of claim 3, further comprising a second sensor configured to sense whether the slider is located at the locking position.

12. The lock device of claim 1, wherein the lock device is communicated with a communication device in a wired or wireless manner, when the lock device receives an unlocking signal from the communication device, the driving module is configured to drive the slider to move to the unlocking position, so that the latch does not block the second object for allowing the second object to move from the retracted position.

13. The lock device of claim 12, wherein the driving module comprises a magnetic component configured to retain the slider at the unlocking position when the slider is located at the unlocking position.

14. The lock device of claim 13, further comprising a resilient component, when the slider is retained at the unlocking position, a movement of the second object from the predetermined position in a retracted direction causing the latch to move from the non-original state to the original state in response to a resilient force provided by the resilient component for allowing the second object to move to an extended position in the opening direction.

15. The lock device of claim 12, further comprising a first sensor configured to sense whether the second object is located at the retracted position.

16. The lock device of claim 15, further comprising a second sensor configured to sense whether the slider is located at the locking position.

17. The lock device of claim 16, further comprising a base mounted on the first object, and the slider, the driving module, the first sensor and the second sensor being arranged on the base.

18. The lock device of claim 17, wherein the base is detachably mounted on the first object.

* * * * *